US007738231B2

(12) United States Patent
Lagnoux

(10) Patent No.: US 7,738,231 B2
(45) Date of Patent: Jun. 15, 2010

(54) OVERVOLTAGE PROTECTION DEVICE WITH SIMPLIFIED DISPLAY SYSTEM AND CORRESPONDING PRODUCTION METHOD

(75) Inventor: Alain René Robert Lagnoux, Rabastens de Bigorre (FR)

(73) Assignee: ABB France, Rueil-Malmaison Cedex (FR)

( * ) Notice: Subject to any disclaimer, the term of this patent is extended or adjusted under 35 U.S.C. 154(b) by 599 days.

(21) Appl. No.: 11/678,452

(22) Filed: Feb. 23, 2007

(65) Prior Publication Data

US 2007/0217106 A1 Sep. 20, 2007

(30) Foreign Application Priority Data

Feb. 24, 2006 (FR) .................................. 06 01678

(51) Int. Cl.
*H02H 7/00* (2006.01)

(52) U.S. Cl. ...................................................... 361/115

(58) Field of Classification Search .................. 361/115
See application file for complete search history.

(56) References Cited

U.S. PATENT DOCUMENTS 6,441,329 B2 * 8/2002 Guille et al. ................ 200/400
2001/0022268 A1 9/2001 Guille et al.

FOREIGN PATENT DOCUMENTS

EP 0451481 10/1991
EP 0897186 2/1999
WO WO2005/112211 11/2005

* cited by examiner

*Primary Examiner*—Stephen W Jackson
(74) *Attorney, Agent, or Firm*—Jason A. Bernstein; Barnes & Thornburg LLP

(57) ABSTRACT

A device (1) for protecting an electrical installation from overvoltages, having at least one protection component (2) and disconnection means (3) capable of changing from a closed configuration to an open configuration, as well as signaling means (5) capable of indicating the configuration of the disconnection means (3). The disconnection means (3) and the signaling means (5) respectively comprise a mobile disconnection element (4) and a mobile signaling element (12) arranged such that, when going from the closed configuration to the open configuration, the mobile disconnection element (4) moves in a rotational movement according to a first trajectory and cooperates with the mobile signaling element (12) to drive the mobile signaling element in rotation along a second trajectory different from the first trajectory.

22 Claims, 5 Drawing Sheets

OVERVOLTAGE PROTECTION DEVICE WITH SIMPLIFIED DISPLAY SYSTEM AND CORRESPONDING PRODUCTION METHOD

PRIORITY CLAIM

This application claims priority to French Patent Application No. 06 01678, filed Feb. 24, 2006, the disclosure of which is incorporated herein by referenced in its entirety.

FIELD OF THE INVENTION

This invention relates to devices for protecting electrical installations and equipment from electrical overvoltages, especially transient overvoltages, in particular, those caused by lightning.

This invention relates more specifically to a device for protecting an electrical installation from overvoltages.

This invention also relates to a method for producing a device for protecting an electrical installation from overvoltages.

BACKGROUND OF THE INVENTION

It is well known to use protection devices capable of protecting electrical or electronic apparatuses from overvoltages that may result, for example, from lightning.

These protection devices usually comprise one or more overvoltage protection components, such as, for example, a varistor or a spark gap. In general, such protection components have two terminals enabling the protection components to connect to the installation to be protected. When the protection components are exposed to voltages above a predetermined threshold, the protection components conduct the default current to the ground while limiting the overvoltage to a value compatible with the capacity of the installation and equipment connected to the protection components. Such components and devices are generally designated by the term "surge protectors" or "lightning arrestors".

In the event of a failure, in particular, at the end of their lifetime, protection components may be subject to significant heating that can cause serious damage to the installation and present risks to the user, for example, by starting a fire.

This is why overvoltage protection devices are generally provided with thermal disconnection means. These thermal disconnection means are intended to isolate the protection component from the electrical installation to be protected in the case of excessive heating of the protection component. The separation of the defective protection component from the installation to which the protection component was connected results in a suppression of the electrical power supply causing the heating and prevents the appearance or limits the harmful consequences of an excessive increase in temperature.

Generally, the thermal disconnection means include an element sensitive to the heat released by the protection component, such as a fusible solder, which, in normal operation, holds a conductor disconnection element, such as a metal spring leaf, in contact with one of the terminals of the protection component. The disconnection element is prestressed toward an open position in which the disconnection element is separated from the terminal so that, when the heat-sensitive element releases the disconnection element under the effect of significant heating of the protection component, the disconnection element moves and opens the circuit.

When the thermal disconnection means are activated, the thermal disconnection means isolate the protection component from the electrical installation to be protected, so that the protection component is incapable of conducting default currents and no longer performs the function of protecting the electrical installation.

This is why it is necessary to warn the user of any activation of the thermal disconnection means, so that the user can replace the defective device in order to continue protecting the installation.

To this end, it is known to integrate, in overvoltage protection devices, signaling means that indicate the state of the disconnection means associated with the protection components.

In particular, it is known to use visual signaling means that display, when the thermal disconnection means are activated, a warning light, such as a red-coloured surface, opposite a window located on the visible surface of a casing in which the protection component is mounted. Thus, when the user examines the electrical panel including the protection devices, the user will immediately know the state of the devices and can perform replacement operations, if necessary.

In particular, it is known to join the disconnection means using a flexible spring leaf, a signaling slider translatably mounted with respect to one of the surfaces of the casing containing the protection component, the slider being located at least partially on the path of the free end of the spring leaf when the spring leaf bends. Thus, when the protection component is disconnected, the free end of the spring leaf can interfere with the slider to exert a stress on the slider and propel the slider in translation along a trajectory substantially tangential to the spring leaf.

While these devices are generally satisfactory, the devices of the prior art can have notable disadvantages.

Indeed, the implementation of such sliders requires the production of parts with a complex shape, small size and with strict tolerances, in particular, to guide the elements in movement. Such parts are, by nature, difficult to produce and to assemble, which tends to increase the costs of production of devices equipped with them.

In addition, the devices of the prior art sometimes have reliability problems with regard to the disconnection, due to the resistance on the signaling slider opposing the opening of the disconnection means. Indeed, the slider is subjected to frictional forces that resist the movement of the slider, and the slider can even be jammed by seizing or sticking at the level of the casing, which has the effect of impeding, slowing or even prematurely blocking the movement of the disconnection leaf. Thus, in the case of a severe failure of the signaling means, the signaling means are capable of preventing the effective disconnection of a defective component, consequently, leading to dangerous heating or even short-circuiting of the installation.

In addition, the kinematic connection between the disconnection leaf and the signaling slider of the devices of the prior art is often achieved by a linear joint where an edge or a small surface element of the disconnection leaf comes into contact with a small surface element of the slider. The small area of the connection puts the connection at risk for an unexpected dislocation, in particular, when the device is subjected to vibrations or shocks, and such a dislocation would lead to a rupture in the connection and random or erroneous signaling that does not reflect the real state of the device. In addition, the fineness of such a connection makes the connection particularly sensitive to dimensional variations in the production of the constituent elements, making it necessary to maintain restrictive provisions during production and/or assembly.

SUMMARY OF THE DISCLOSURE

The features of the present invention address the various disadvantages mentioned above and provide a device for protecting an electrical installation from overvoltages, in which the design of the signaling means is particularly simple and reliable.

A feature of the present invention is to provide an overvoltage protection device having a safety mechanism that, in the event of failure of the protection component, is particularly reliable.

Another feature of the present invention is to provide an overvoltage protection device that is particularly simple and inexpensive to produce.

Another feature of the present invention is to provide a method for producing an overvoltage protection device that is particularly simple and inexpensive.

The features of the present invention are achieved by a device for protecting an electrical installation from overvoltages comprising at least one protection component intended to be connected to the electrical installation, disconnection means capable of changing from a closed configuration, in which the protection component is connected to the electrical installation, to an open configuration, in which the protection component is disconnected from the electrical installation, and a signaling means capable of showing the configuration of the disconnection means, wherein the disconnection means and the signaling means respectively comprise a mobile disconnection element and a mobile signaling element, the mobile disconnection element being capable of moving, when changing from the closed configuration to the open configuration, in a rotational movement along a first trajectory, wherein the mobile disconnection element, when changing from the closed configuration to the open configuration, cooperates with the mobile signaling element to drive the mobile signaling element in rotation along a second trajectory that is different from the first trajectory.

The features of the present invention are also achieved by means of a method for producing a device for protecting an electrical installation from overvoltages, wherein the device comprises at least one protection component intended to be connected to an electrical installation, disconnection means capable of changing from a closed configuration, in which the protection component is connected to the electrical installation, to an open configuration, in which said protection component is disconnected from the electrical installation, and a signaling means capable of indicating the configuration of the disconnection means, wherein the disconnection means and the signaling means respectively comprise a mobile disconnection element and a mobile signaling element, with the mobile disconnection element being capable of moving, when changing from the closed configuration to the open configuration, according to a rotational movement along a first trajectory, an comprising an arrangement step (a) in which the mobile disconnection element is arranged with respect to the mobile signaling element so that, when changing from the closed configuration to the open configuration, the mobile disconnection element cooperates with the mobile signaling element to drive the mobile signally element in rotation along a second trajectory that is different from the first trajectory.

BRIEF DESCRIPTION OF THE DRAWINGS

Other features and advantages of the present invention appear in greater detail on reading the following description, and with reference to the drawings which are provided purely for illustrative and non-limiting purposes.

DETAILED DESCRIPTION OF THE EMBODIMENTS

Figure 1:
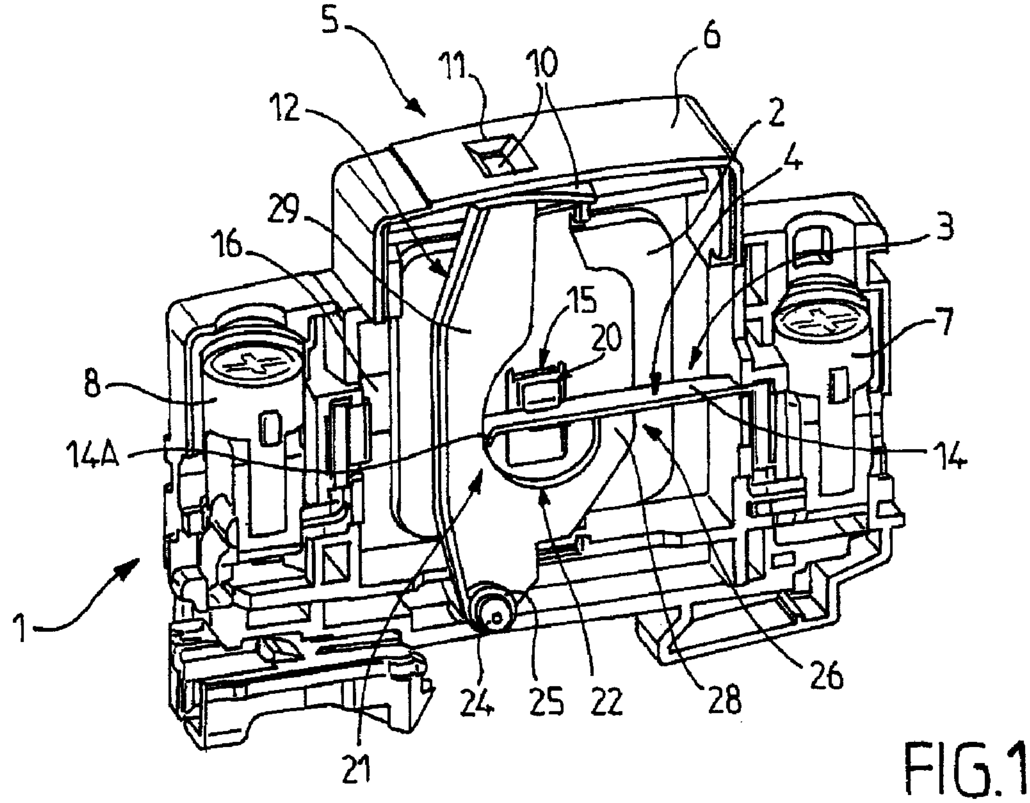
FIG. 1 is a perspective cross-section view of a protection device according to one exemplary embodiment of the present invention in which the disconnection means are in the closed configuration.

The overvoltage protection device 1 according to the present invention is intended to be shunt-connected (or connected "in parallel") to an electrical installation to be protected.

For purposes of the present disclosure, the term "electrical installation" refers to any type of electrically powered apparatus or network capable of undergoing voltage disturbances, in particular, transient overvoltages caused by lightning.

The electrical installation overvoltage protection device 1 can advantageously be a lightning arrestor.

The overvoltage protection device 1 according to the present invention is advantageously intended to be placed between a phase of the installation to be protected and the ground. It is also possible to envisage, without going beyond the scope of the present invention, that the device 1, instead of being shunt-connected between a phase and the ground, is connected between a neutral conductor and the ground, between the phase and the neutral conductor, or between two phases (differential protection).

The protection device 1 according to the present invention has at least one protection component 2 intended to be electrically connected to the electrical installation to protect the electrical installation from overvoltages, in particular, transient overvoltages. In the following description, each overvoltage protection component 2 is formed by a varistor, with the understanding that the use of a varistor is indicated only by way of example and in no way constitutes a restriction of the present invention.

More generally, the overvoltage protection device according to the present invention is, when exposed to voltages above a predetermined threshold value, capable of conducting the default current to the ground while limiting the overvoltage to a value compatible with the capacity of the installation.

The varistor is preferably in the form of a substantially flat parallelepiped rectangle equipped with two power supply terminals 15, 16.

The protection device 1 also includes disconnection means 3 capable of ensuring the electrical disconnection of the varistor 2 from the electrical installation, in particular, in the event of a failure of the varistor 2. More specifically, the disconnection means 3 are preferably heat-sensitive and capable of being activated under the effect of the heat released if there is excessive heating of the protection component 2.

Thus, the disconnection means 3 are capable of going from a closed configuration, in which the protection component 2 is connected to the electrical installation, to an open configuration, in which said protection component 2 is disconnected from the electrical installation.

For purposes of the present disclosure, the term "closed configuration" refers to the state of the protection device 1 in which the varistor 2 is electrically connected to the electrical installation to be protected, i.e., in which the power supply circuit of the varistor 2 is closed. For the sake of simplicity, we will consider the term "closed configuration" to be applied indifferently to the protection device 1 as a whole, to the disconnection means 3, or to any other element constituting the device 1, when the elements are in the state corresponding to the situation in which the varistor 2 is connected to the electrical installation to be protected, i.e., when the disconnection means are in the closed configuration.

For purposes of the present disclosure, the term "open configuration" refers to a state of the protection device 1 in which the varistor 2 is isolated from the electrical installation to be protected, i.e., in which the power supply circuit of the varistor 2 is open. For the sake of simplicity, we will consider the term "open configuration" to be applied indifferently to the device as a whole, to the disconnection means 3, or to any other element constituting the device 1, when the elements are in the state corresponding to the situation in which the disconnection means are in the open configuration.

According to an important feature of the present invention, the disconnection means 3 comprise a mobile disconnection element 4 capable of being moved, when changing from the closed configuration to the open configuration, according to a rotational movement along a first trajectory.

The mobile disconnection element 4 is preferably prestressed by spring means that exert, on the mobile disconnection element, a force that tends to bring the mobile disconnection element back to the open configuration.

The rotational movement of the mobile disconnection element 4 is preferably achieved substantially in a plane parallel to one of the main extension surfaces of the varistor 2. In addition, the trajectory of the mobile disconnection element can be substantially contained in the limits defined by the contours of the varistor 2 projected in the plane of the trajectory. Thus, the arrangement of the mobile disconnection element 4 is, in particular, capable of effectively making use of the available space and limiting the total bulk of the device 1.

The protection device 1 according to the present invention also has signaling means 5 capable of indicating the configuration of the disconnection means 3. More specifically, the signaling means are intended to inform the user by indicating whether the protection device 1 is in the open configuration or in the closed configuration.

The device 1 according to the present invention preferably includes an insulating casing 6 in which the protection component 2 is mounted, which can also contain the disconnection means 3 and the signaling means 5. The casing 6 can, for example, be formed either by a hollow body surmounted by a cover or by two substantially symmetrical side panels connected at the plane of symmetry of the casing.

The device 1 can advantageously include two conductive elements respectively forming a first connection element 7 and a second connection element 8, the elements preferably being housed inside the casing 6 so that the elements enable the connection of the device 1 to the electrical installation to be protected.

The signaling means preferably comprise a visual indicator 10 that is capable of being positioned opposite a display window 11 provided in the casing 6. For example, the signaling means can have a first green-coloured surface element opposite the display window 11 when the protection device 1 is in the closed configuration and can have a second red-coloured surface element opposite the window 11, to replace the green element, when the protection device is in the open configuration. Of course, the signaling means are not necessarily limited to visual signaling and can comprise, for example, other elements capable of providing a remote signal, in particular, electrical, such as micro-switches, without going beyond the context of the present invention.

According to the present invention, the signaling means 5 comprise a mobile signaling element 12 capable of performing a rotational movement when changing from the closed configuration to the open configuration.

Advantageously, the use of a rotational movement, for example, implementing an adjusted sliding pivot-type connection, makes it possible to simplify the guiding of the mobile signaling element, to eliminate the risks of jamming by sticking and to limit the resistance to movement due to friction.

Preferably, the mobile disconnection element 4 and the mobile signaling element 12 will be located opposite the same surface of the varistor 2 and the trajectories of the mobile disconnection element 4 and the mobile signaling element 12 will be substantially coplanar. Thus, it will advantageously be possible to optimize the bulk of the device 1.

In addition, according to an important feature of the present invention, the mobile disconnection element and the mobile signaling element are arranged so that, when changing from the closed configuration to the open configuration, the mobile disconnection means 4 cooperate with the mobile signaling element 12 in order to drive the mobile signaling element 12 in rotation along a second trajectory different from the first trajectory followed by the mobile disconnection element 4.

For purposes of the present disclosure, the term "cooperate" means that the mobile disconnection element 4 is capable of transferring motor energy to the mobile signaling element 12, in particular when changing from the closed configuration to the open configuration, to drive the mobile signaling element in rotation. More specifically, the mobile disconnection element 4 is capable of transmitting a force, in particular, a motor torque, to the mobile signaling element 12 capable of causing a movement of the mobile signaling element.

Thus, the mobile disconnection element 4 and the mobile signaling element 12 preferably have a common source of energy formed by the return means that act on the mobile disconnection element 4.

In addition, the fact that the mobile signaling element 12 moves along a trajectory different from that taken by the mobile disconnection element 4 can advantageously make it possible to offset the signaling, in particular, at the level of a visible surface of the casing 6 while the disconnection occurs in a the location of the casing remote from the visible surface.

According to a preferred alternative exemplary embodiment, the disconnection means 3 include a spring leaf 14, also called "disconnection leaf", of which a free end is capable of elastically bending during the change from the closed configuration to the open configuration.

The spring leaf 14 is electrically conductive and arranged to be capable of electrically connecting one of the connection elements 7, 8 to one of the power supply terminals 15, 16 of the varistor 2. Even more preferably, when the disconnection means 3 are in the closed configuration, the free end of the spring leaf 14 is kept prestressed by a fusible solder 20, which preferably produces a direct connection between the free end of the spring leaf and one of the terminals 15, 16. The prestress is advantageously obtained by elastic deformation of the spring leaf in the closed configuration.

Below, the closed configuration will be considered to be that in which the disconnection leaf 14 is connected to the power supply terminal referenced 15, without this constituting a restriction of the present invention.

In addition, according to a preferred exemplary embodiment, the power supply terminal 15 to which the disconnection leaf 14 is connected is preferably located substantially at the centre of the main extension surface of the varistor 2.

Thus, if the varistor 2 heats up excessively, the varistor 2 is capable of transmitting enough thermal energy to the fusible solder 20 to cause the fusible solder 20 to rupture, in particular, by melting, to release the free end of the spring leaf 14, which then bends under the effect of the elastic return stress and moves away from the terminal 15 of the varistor to which the spring leaf 14 was connected.

The mobile disconnection element 4 is advantageously arranged to be capable of opening the electrical power supply circuit of the protection component 2 by separating a mobile contact from a stationary contact when it moves from a position that it occupies in the closed configuration to a position that it occupies in the open configuration.

To enable the mobile disconnection element 4 to transmit a movement to the mobile signaling element 12, the two mobile elements are preferably coupled by a transmission member that creates a kinematic connection between the two mobile elements. The connection can be permanent, temporary or intermittent without going beyond the scope of the present invention. The connection is preferably substantially continuous when moving from the closed configuration to the open configuration.

The transmission member can, in particular, include a system for transferring movement by a connecting rod assembly, a system for direct or indirect engagement of the mobile elements by friction, or a gear system, in which, for example, a toothed crown element borne by the mobile disconnection element 4 cooperates with a pinion securely connected to the mobile signaling element 12.

However, according to a preferred exemplary embodiment, the mobile signaling element 12 comprises a cam 21 against which the mobile disconnection element 4 is capable of sliding to drive the cam 21 in rotation when moving from the closed configuration to the open configuration.

Advantageously, a cam-type element combines simplicity of production, ease of assembly and operational strength.

In a particularly advantageous manner, the cam 21 is formed by a ramp 22 provided at the level of the mobile signaling element 12.

According to a preferred exemplary embodiment, the point 14A of the free end of the spring leaf 14 is intended to come into sliding contact with the ramp 22.

Thus, according to an important feature of the present invention, the mobile disconnection element and the mobile signaling element are arranged so that a portion of the mobile disconnection element 4 is capable, when going from the closed configuration to the open configuration, of coming into contact with the ramp 22 so that, when the mobile disconnection element moves, the movement causes a thrust force at the level of the ramp involving both a tilting of the mobile signaling element 12 and a sliding of the mobile disconnection element 4 along the ramp 22.

Such a direct transmission of movement by contact between the mobile disconnection element 4 and the mobile signaling element 12 advantageously makes it possible to simplify the structure of the device, which contributes to making the device generally more compact and increases the reliability of the device with regard to the disconnection.

The ramp 22 can comprise a plurality of segments having different profiles without going beyond the scope of the present invention. In particular, the ramp segments can have profiles that differ by virtue of the respective spatial orientation, or by the concave or convex orientation of their curves and/or the value of their radii of curvature.

Thus, according to an alternative exemplary embodiment shown, in particular, in FIGS. 2, 4, 7 and 9, the ramp can include three successive segments 22A, 22B, 22C, the first segment 22A having, with respect to the spring leaf 14, a concave profile with a substantially increasing radius of curvature, and the second segment 22B forming a convex transition toward the third segment 22C, itself slightly concave or even substantially rectilinear.

In addition, according to a preferred exemplary embodiment, the mobile signaling element 12 is mounted so as to pivot freely with respect to the protection component 2, i.e., the mobile signaling element 12 pivots freely about an axle 24, the axle being realized or not.

In a particularly advantageous manner, the free pivot axle 24 can form a single piece with the casing 6. Thus, the number of parts to be assembled can be limited by producing the axle 24 and the body of the casing 6 in a single piece, for example, by moulding. In addition, the mobile signaling element 12 can advantageously comprise a tubular cross-section 25 forming a sleeve intended to be attached to the axle 24 to form a pivoting connection, possibly a sliding pivot, with the casing 6.

The device 1 according to the present invention can also advantageously include holding means 26 that impede the movement of the mobile signaling element 12 when the disconnection means 3 are in the closed configuration.

Thus, the holding means are capable of preventing the mobile signaling element 12 from moving significantly, in particular, toward the position that the mobile signaling element 12 normally occupies in the open configuration, while the disconnection means are in the closed position. In other words, the holding means are intended to prevent an accidental movement of the mobile signaling element that would cause an erroneous indication of the real state of the protection device 1.

According to a preferred alternative exemplary embodiment, the mobile signaling element 12 includes a projecting portion 28 that is capable, when the disconnection means 3 are in the closed configuration, of abutting a portion of the mobile disconnection element 4 in order to form the holding means 26.

Figure 6:
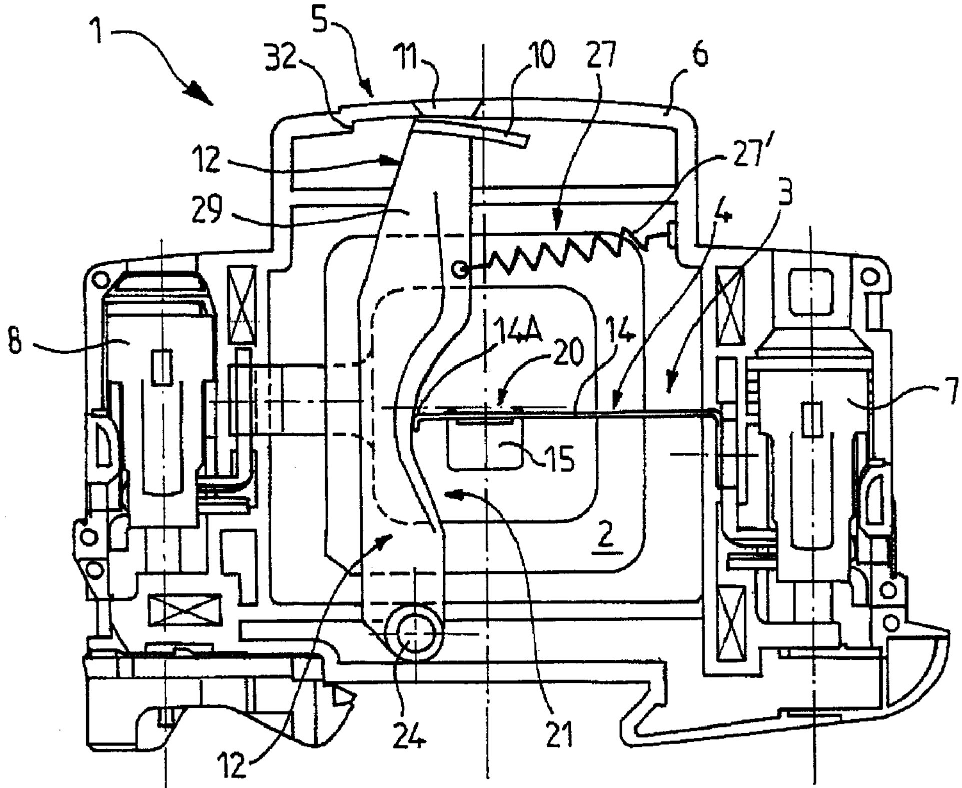
FIG. 6 is a front cross-section view of an alternative exemplary embodiment of a device according to the present invention in which the disconnection means are in the closed configuration.
Figure 8:
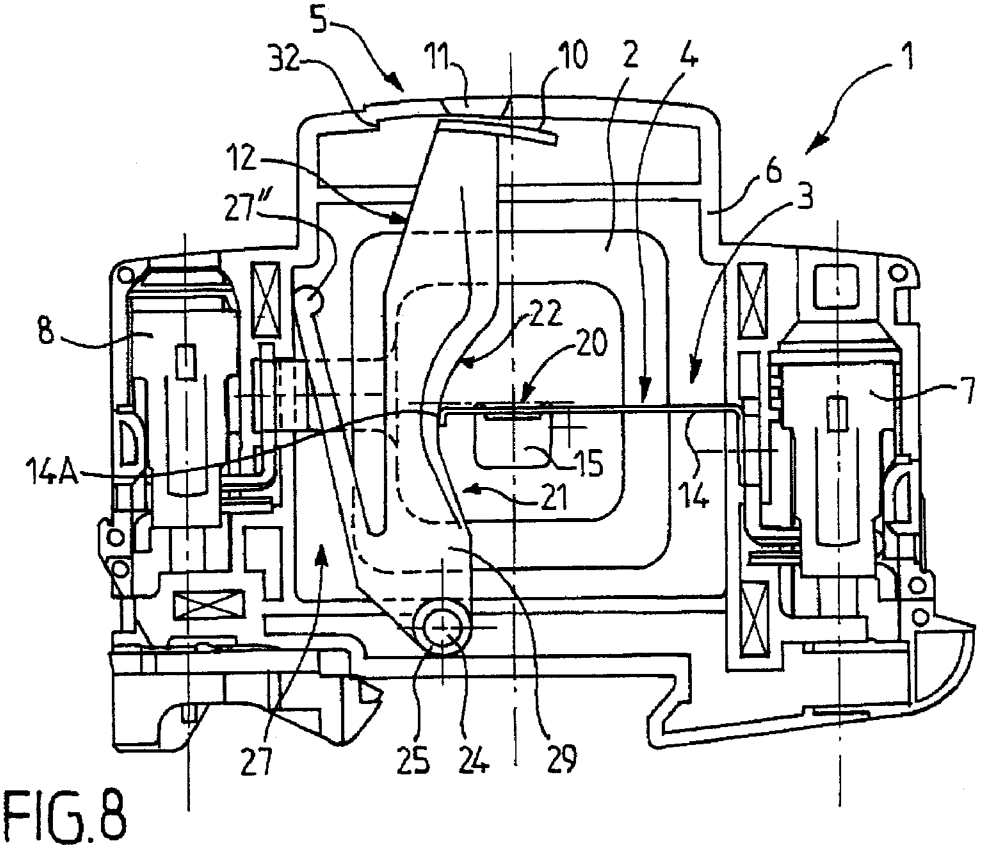
FIG. 8 is a front cross-section view of an alternative exemplary embodiment of a device according to the present invention in which the disconnection means are in the closed configuration.

According to another exemplary embodiment shown in FIGS. 6 and 8, the holding means 26 can be formed by elastic stress means 27 that act at the level of the mobile signaling element 12, substantially opposing the mobile disconnection element 4. In other words, the elastic stress means 27 are capable of applying, on the mobile signaling element 12, a resisting torque substantially opposing the motor torque transmitted by the mobile disconnection element 4.

Naturally, the elastic stress means 27 will be sized so that the resisting torque has a value lower than that of the motor torque, and preferably substantially negligible with respect to the motor torque, so as not to constitute an obstacle to the disconnection.

The elastic stress means 27 can, for example, be formed by a return spring 27' connecting the casing 6 to the mobile signaling element 12, as shown in FIG. 6, or by an elastic arm 27" forming a single piece with the mobile signaling element 12, and pressing against one of the walls of the casing 6, as shown in FIG. 8.

Figure 2:
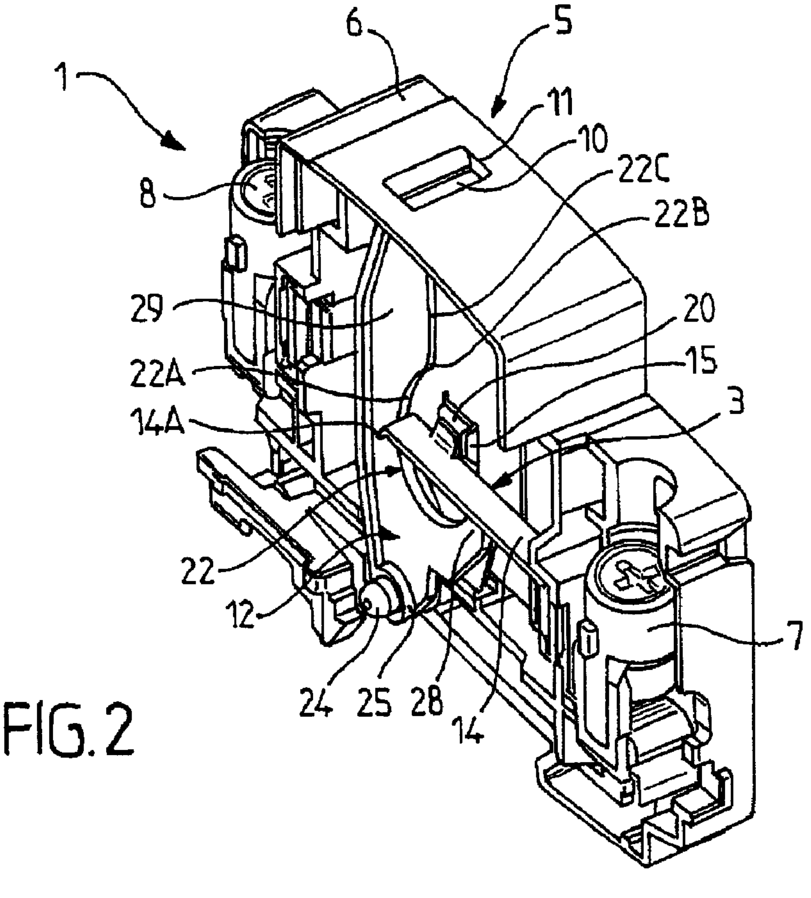
FIG. 2 is a perspective cross-section view of the protection device of FIG. 1 from a different perspective with the disconnection means also in the closed configuration.
Figure 3:
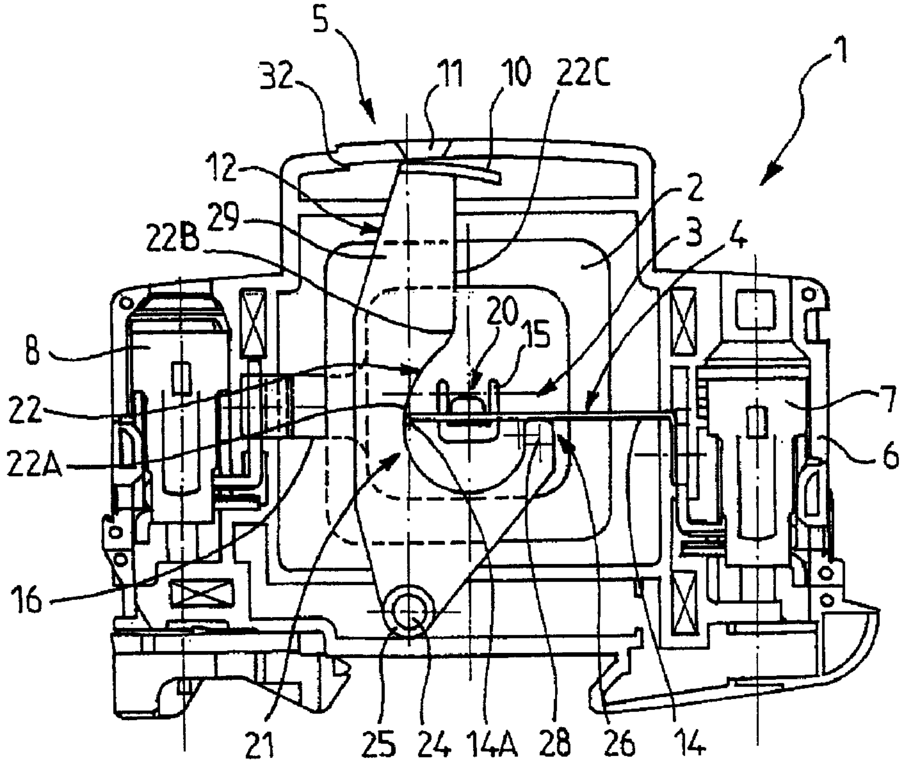
FIG. 3 is a front cross-section view of the device of FIG. 1 in which the disconnection means are in the closed configuration.

It is remarkable that, when the mobile signaling element 12 comprises a projecting portion 28 as shown in FIGS. 1-3, the holding means 26 are capable of opposing the angular range of movement of the mobile signaling element 12, but that the mobile signaling element 12 is not necessarily strictly immobilized, because a clearance may remain between the projecting portion 28 and the portion of the mobile disconnection element 4 against which the mobile signaling element 12 is capable of abutting. However, this possible clearance is low enough so that the amplitude of the slight residual angular range of movement allowed will always be insufficient to allow the mobile signaling element to move significantly toward the position normally occupied by the mobile signaling element in the open configuration, so that the holding means 26 actually prevent the signaling means 5 from providing the user of the device 1 with an erroneous indication regarding the configuration of the device 1.

According to a particularly preferable alternative exemplary embodiment, the mobile signaling element 12 is formed by a single part 29, called a "tipper", which includes a concave area intended to cooperate with the mobile disconnection element 4, a projecting extension 28 intended to come into contact with the mobile disconnection element 4 to impede the movement of the single part 29 when the disconnection means 3 are in the closed configuration, and a tubular sleeve 25.

Thus, the mobile signaling element 12 can advantageously be formed by a sickle-shaped tipper 29, having the appearance of a hook with the concave area of the curved portion corresponding to a portion of the ramp 22, the point, preferably flattened or rounded, forming the projecting portion 28, and the end of the shank supporting the visual indicator(s) 10.

Advantageously, the tipper 29 has a light structure and can, in particular, be made of a polyamide, a polycarbonate or ABS, so that the inertia is negligible with respect to the motor force produced by the spring leaf 14. In particular, the weight of the tipper 29 can be between 1 g and 5 g, and preferably less than 2 grams.

According to a preferred exemplary embodiment, the device 1 according to the present invention includes first anti-recoil means 30 capable of limiting, when the disconnection means 3 are in the open configuration, a possible return movement of the mobile signaling element 12 toward the position occupied when the disconnection means 3 were in the closed configuration.

Figure 5:
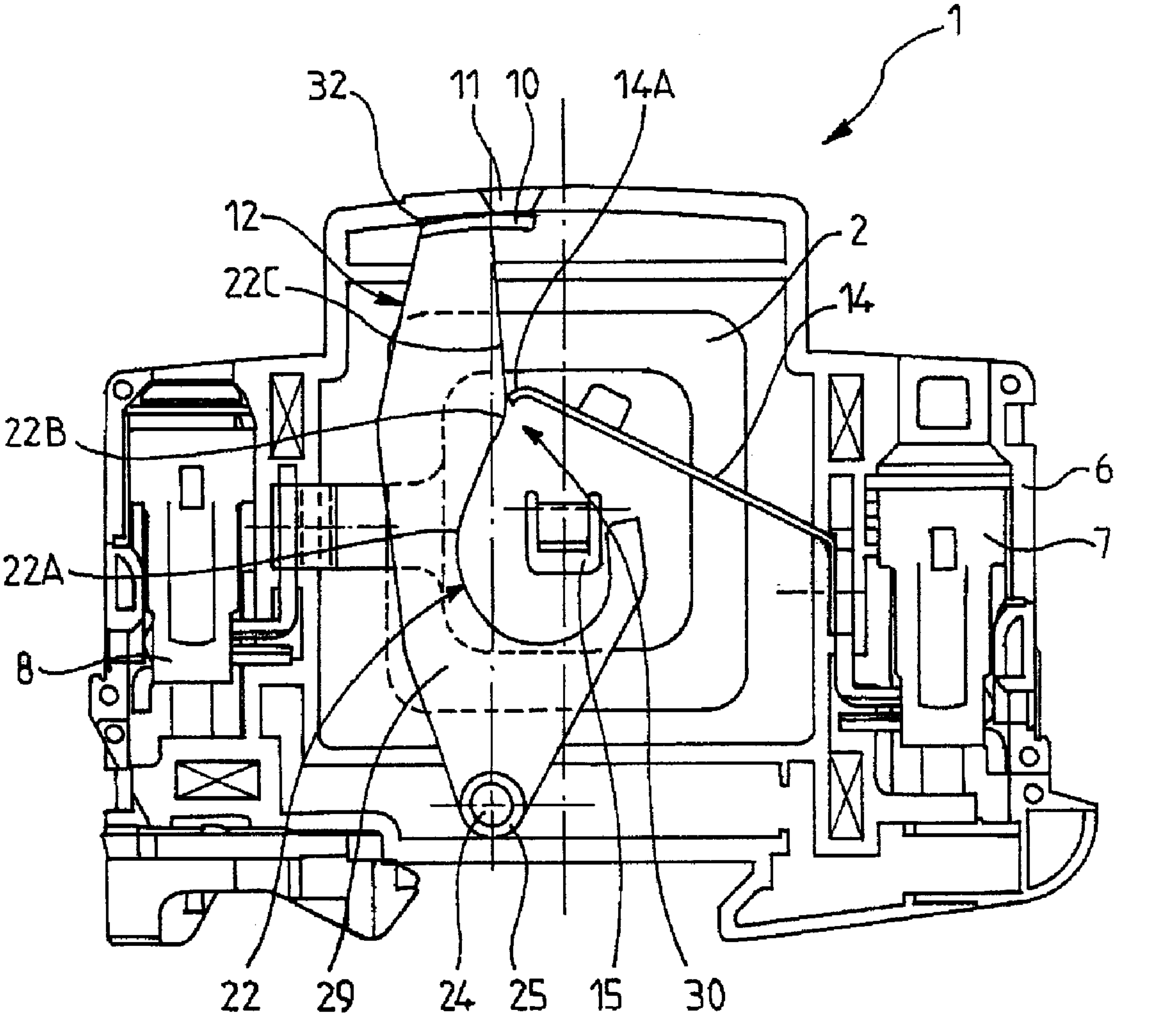
FIG. 5 is a front cross-section view of the device of FIG. 3 in which the disconnection means are in the open configuration.

In a particularly preferable manner, as shown in FIG. 5, the mobile disconnection element 4 forms the first anti-recoil means. To this end, the spring leaf 14 is positioned, in the open configuration, to interfere with the trajectory that the tipper 29 should take if the tipper 29 should return to the position occupied in the closed configuration. Of course, the stiffness of the leaf is adequate to prevent the leaf from bending under the action of the tipper alone, in particular, in the case of a mechanical shock undergone by the device 1.

In addition, in an alternative exemplary embodiment, the device 1 according to the present invention can also include second anti-recoil means capable of limiting, when the disconnection means 3 are in the open configuration, a possible return movement of the mobile disconnection element 4 toward the position occupied in the closed configuration.

In a particularly advantageous manner, the second anti-recoil means can be implemented once the disconnection leaf 14 is far enough from the terminal 15 of the varistor to maintain a minimal distance of isolation between the spring leaf and the power supply terminal 15. Such an implementation is particularly useful if the disconnection is performed under unfavourable conditions of voltage and current capable of causing the striking of an electric arc between the leaf 14 and the terminal 15.

In particular, if the position of the free end of the leaf 14 in the open configuration corresponds to a resting position of the leaf, i.e., a state in which the leaf is free from elastic stress, the second anti-recoil means can be arranged to substantially prevent the free end of the spring leaf 14 from oscillating around the resting position, for example, by being placed sufficiently close to the resting position to reduce the amplitude of any oscillations to a very low level, or even by coming into contact with the free end.

For example, according to an alternative exemplary embodiment not shown, the second anti-recoil means can be formed by a flexible elastic tab forming a single piece with the ramp 22, the tab forming a ratchet capable of bending and retracting to give way to the free end of the spring leaf 14 during the change from the closed configuration to the open configuration, then straightening out to impede a return of the mobile disconnection element in the reverse direction. In particular, it is possible to envisage that the tab can be retracted, under the pressure of the point 14A, in a recess provided for this purpose in the ramp 22, so that the tab can be flush with the profile of the ramp 22 and provide the continuity of the ramp 22, then move up again by elastic return to project over the profile.

Figure 7:
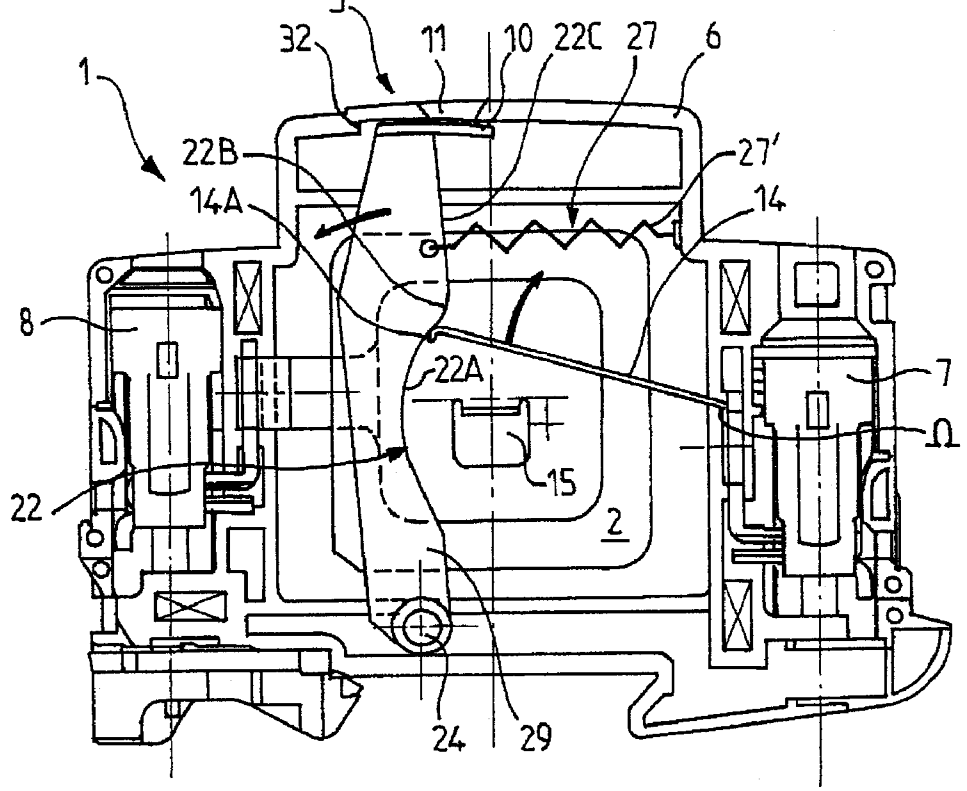
FIG. 7 is a front cross-section view of the device of FIG. 6 in which the disconnection means go from the closed configuration to the open configuration.
Figure 9:
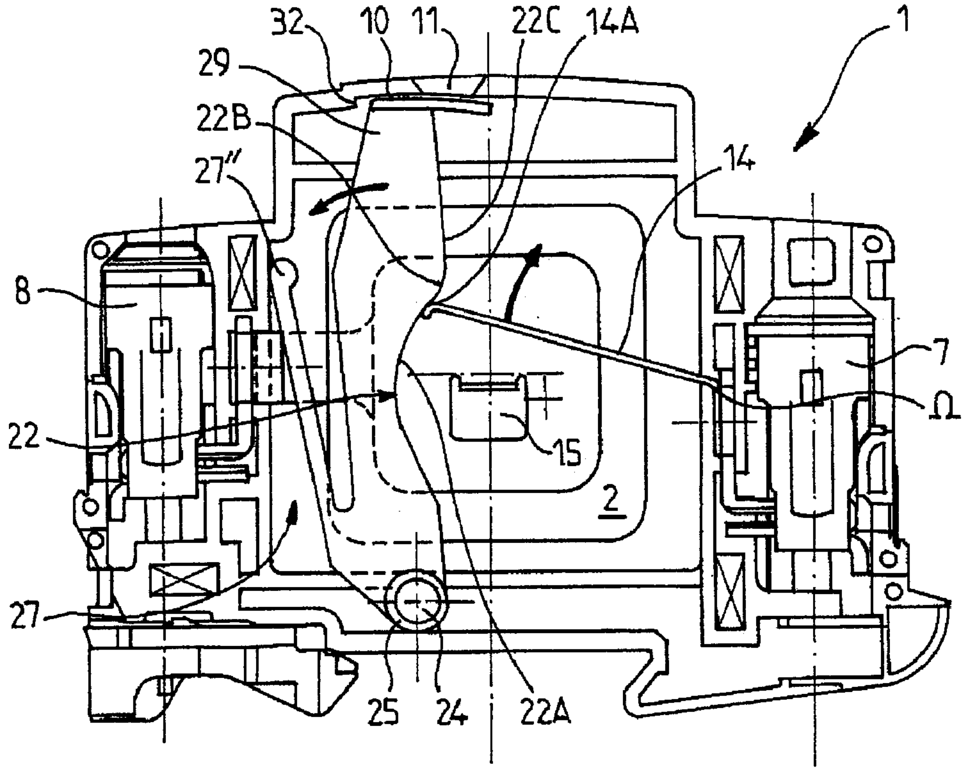
FIG. 9 is a front cross-section view of the device of FIG. 8 in which the disconnection means change from the closed configuration to the open configuration.

According to another alternative exemplary embodiment, as shown in FIGS. 7 and 9, the anti-return ratchet can be formed by the combination of the second segment 22B that projects over the profile of the ramp 22 and the elastic stress means 27, 27', 27" that substantially continuously push the ramp 22 against the point 14A. Thus, if the disconnection leaf 14, carried away by the impetus during the change from the closed configuration to the open configuration, crosses the convex segment 22B, the disconnection leaf 14 is incapable of performing a return movement toward the position occupied in the closed configuration.

It is possible to combine, in a single device 1, the first and second anti-recoil means disclosed above. Thus, in a particularly advantageous manner, the mobile disconnection element 4 and the mobile signaling element 12 can be arranged so that, when the disconnection means 3 are in the open configuration, the mobile disconnection element 4 and the mobile signaling element 12 mutually impede the respective movements so that neither the mobile disconnection element 4 nor the mobile signaling element 12 can return substantially toward, and therefore to, the positions respectively occupied when the disconnection means 3 were in the closed configuration.

Finally, the device 1 according to the present invention can advantageously comprise a stop element 32, formed, for example, by a shoulder of the casing 6, which limits the range of movement of the mobile signaling element 12 in the direction of movement that enables it to go from the closed configuration to the open configuration.

The operation of a device according to one exemplary embodiment of the present invention will now be described in detail.

Figure 4:
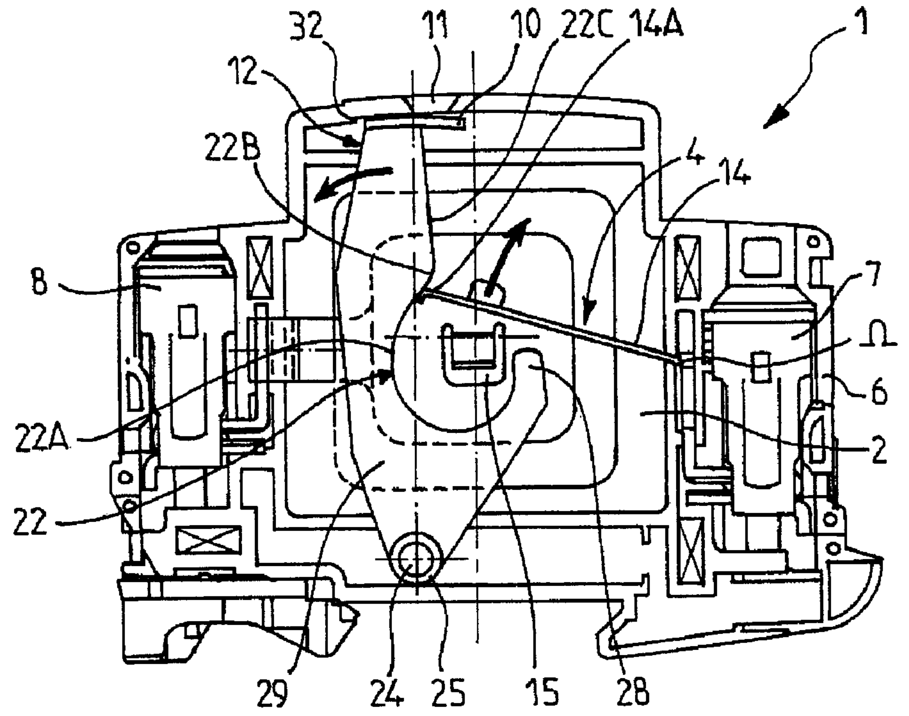
FIG. 4 is a perspective cross-section view of a protection device according to FIG. 3 in which the disconnection means are in the closed configuration.

For the sake of simplicity, we will consider the rotational movement of the mobile disconnection element 4 to occur in the clockwise direction and the rotational movement of the mobile signaling element 12 to occur in the counter-clockwise direction, as indicated by the arrows associated with these mobile elements in FIGS. 4, 7 and 9, wherein the mobile elements move substantially parallel to one of the surfaces, preferably the main extension surface, of the varistor 2. Of course, this choice of orientation in no way constitutes a restriction of the present invention.

As shown in FIGS. 1, 2, 3, 6 and 8, when the protection device 1 is in the closed configuration, the spring leaf 14 is kept bent and prestressed by a fusible solder 20 that connects the free end of the spring leaf 14 to the first power supply terminal 15 of the varistor 2. Thus, the first power supply terminal 15 is electrically connected to the first connection element 7, while the second terminal 16 of the varistor is electrically connected to the second connection element 8.

In the case of the exemplary alternative shown in FIGS. 1-3, in the closed configuration, the sickle-shaped tipper 29, which is attached to pivot freely, at the level of the tubular sleeve 25, on the axis 24 forming a single piece with the body of the casing 6, is placed so that the projecting extension 28 forming the point of the tipper can come into contact with the spring leaf 14. The spring leaf 14 is held in position by the fusible solder 20, so that a barrier is formed that prevents, or at the very least strongly limits, the angular range of movement of the tipper 29 in the counter-clockwise direction. In other words, when the spring leaf 14 is in the closed configuration, a portion of the free end of the spring leaf 14 preferably impedes the movement of the projecting extension 28 of the tipper 29.

In the case of the exemplary alternatives shown in FIGS. 6 and 8, the holding effect produced by the holding means 26 is obtained not by a barrier as described in the preceding paragraph but by an elastic support provided by the elastic stress means 27, 27', 27".

In addition, in the closed configuration, the point 14A can advantageously be in the vicinity of the concave ramp 22, and preferably substantially press against the concave ramp 22. In a particularly advantageous manner, the second stop point complements the holding means 26 by substantially preventing the tipper 29 from pivoting in the clockwise direction. Thus, the mobile signaling element 12 is substantially immobilized in rotation, by a double limitation on the angular range of movement, when the disconnection means 3 are in the closed position.

Advantageously, the tipper 29 has a green-coloured surface opposite the observation window 11, indicating that the device is in the operational state.

When a defect occurs in the varistor 2, causing the varistor to heat up, the varistor transmits the heat to the fusible solder 20.

Under the combined effects of the heat released by the varistor 2 and the return stress exerted on the spring leaf 14, the fusible solder 20 breaks and releases the free end of the spring leaf.

As shown in FIGS. 4, 7 and 9, the spring leaf 14 initiates a deflection movement, with the free end pivoting, in this case, in the clockwise direction, once the spring leaf 14 has been released from the blocking effect produced by the fusible solder 20.

In the exemplary embodiment shown in FIG. 4, when the spring leaf 14 initiates its rotational movement, the spring leaf 14 detaches from the projecting extension 28 whose passage it prevented, so that the tipper 29 is released from the holding means 26 that restricted the angular range of movement of the tipper 29, in this case in the counter-clockwise direction. Thus, during the change from the closed configuration to the open configuration, the free end of the spring leaf 14 tends to move away from the trajectory of the projecting extension 28 of the tipper 29.

In a particularly advantageous manner, the deflection movement of the spring leaf 14 is accompanied by a transmission of movement between the spring leaf 14 and the tipper 29, so that the tipper 29 pivots around the axle 24.

To this end, the tipper 29 and the spring leaf 14 are arranged so that when the free end of the spring leaf 14 bends during the change from the closed configuration to the open configuration, a portion of the spring leaf 14, preferably the point 14A, pushes the tipper 29 at the concave area to cause the tipper 29 to pivot.

As the spring leaf 14 moves angularly, the point 14A progresses by sliding along the ramp 22. As the length of the free end of the spring leaf 14 is substantially constant and the uncurved profile of the first segment 22A of the ramp tends to approach the stationary centre of rotation Ω of the free end, this progression is accompanied mechanically by a repulsion effect of the ramp and the progressive driving in rotation of the tipper 29.

To facilitate the sliding of the point 14A at the level of the ramp 22, the point can advantageously have a curved portion that allows for progressive and regular engagement on the ramp and, consequently, limits the risks of seizing.

In addition, in the alternative exemplary embodiment shown in FIG. 4, because the tipper 29 is particularly light and mounted to pivot freely, the tipper 29 opposes only a slight mechanical resistance to the movement of the spring leaf, the resistance due essentially to the friction appearing at the level of the pivot pin 24, 25 of which the resulting resisting torque is negligible with respect to the motor torque resulting from the thrust force exerted by the spring leaf 14 on the ramp 22 at the level of the point 14A. Advantageously, the lever arm corresponding to the distance separating the axle 24 from the area where the spring leaf 14 is engaged with the ramp 22 makes it possible to amplify the motor torque, i.e., to overcome the resisting torque with a relatively low thrust force.

Furthermore, in the case of the alternative exemplary embodiments shown in FIGS. 7 and 9, the elastic stress means 27, 27', 27" are sized to create only a particularly low resisting torque with respect to the motor torque created by the spring leaf 14.

Thus, the driving of the mobile signaling element uses only a small portion of the motor energy used by the spring leaf in order to carry out the disconnection, and does not substantially disrupt this essential safety function of the device 1.

Moreover, the profile of the ramp 22 may have irregularities, and even be rack-shaped, so that the contact with the point 14A involves a series of discontinuous contacts, provided that the arrangement of the ramp 22 with respect to the trajectory of the point 14A is such that the leaf can generally propel the tipper 29 by pushing it without encountering any obstacle.

However, the ramp 22 will preferably have a substantially regular and smooth profile so that the respective movements of the mobile disconnection element 4 and the mobile signaling element 12 are fluid, without bounces, and the use of motor energy is regular.

When the tipper 29 pivots under the motor effect of the disconnection leaf 14, the shank describes a circular trajectory, in a counter-clockwise direction indicated by the arrow associated with the tipper in FIGS. 4, 7 and 9, so that the visual indicator 10 moves with respect to the window 11. In this preferred exemplary alternative, the indicator has a second red-coloured surface, contiguous with the green surface, so that the pivoting causes the replacement, opposite the window 11, of the green indicator by the red indicator when the disconnection means 3 change from the closed configuration to the open configuration.

The rotation movement of the tipper 29 is preferably stopped when the tipper 29 bumps into the shoulder of the casing 32, which forms a dead stop opposite the end with the visual indicators. Thus, the movement of the tipper is interrupted when the appropriate visual indicator is opposite the window 11.

In a particularly advantageous manner, this interruption in the movement of the tipper 29 occurs only after the disconnection leaf 14 is far enough from the terminal 15 of the varistor to ensure the electrical isolation of the varistor.

In a particularly advantageous manner, the mobile signaling element 12 is substantially held in position when the device 1 is in the open configuration, because the angular range of movement is limited both by the stop element 32 in the forward direction and by the point 14A in the return direction.

Of course, the present invention is not limited to an open configuration in which the position of the spring leaf 14 corresponds to the crossing by the point 14A of the convex segment 22B, as shown in FIG. 5. In particular, the rotation of the spring leaf 14 can be interrupted indifferently when the point 14A is at the level of the first segment 22A, the second segment 22B or the third segment 22C.

A method for producing a device 1 according to the present invention will now be briefly described.

According to an important feature of the present invention, the method for producing a device 1 for protecting an electrical installation from overvoltages, the device 1 comprising at least one protection component 2 intended to be connected to the electrical installation, disconnection means 3 capable of changing from a closed configuration, in which the protection component 2 is connected to the electrical installation, to an open configuration, in which the protection component 2 is disconnected from the electrical installation, and a signaling means 5 capable of indicating the configuration of the disconnection means 3, wherein the disconnection means 3 and the signaling means 5 respectively comprise a mobile disconnection element 4 and a mobile signaling element 12, in which the mobile disconnection element 4 is capable of moving, when changing from the closed configuration to the open configuration, in a rotational movement according to a first trajectory, comprises an arrangement step (a) in which the mobile disconnection element 4 is arranged with respect to the mobile signaling element 12 so that, when changing from the closed configuration to the open configuration, the mobile disconnection element 4 cooperates with the mobile signaling element 12 to drive the mobile signaling element 12 in rotation along a second trajectory that is different from the first trajectory.

More specifically, the production method applies to a preferred alternative exemplary embodiment, as shown in FIGS. 1-5, without this constituting a limitation of the present invention.

Advantageously, the method for producing a device 1 according to the present invention can comprise, prior to the arrangement step (a), a step (b) of producing, preferably by moulding, a monolithic tipper 29 intended to form the mobile signaling element 12. The tipper is preferably substantially flattened and sickle-shaped, has a tubular sleeve 25 of which the axis is substantially normal to its main extension plane, a first concave ramp segment 22A preferably formed on the section (edge) of the tipper and intended to cooperate with the mobile disconnection element 4, and a projecting extension 28 intended to come into contact with the mobile disconnection element 4, and an elongated arm (shank) of which the end is intended to act as a support for a visual indicator 10.

Preferably the arrangement step (a) comprises a sub-step (c) in which a spring leaf 14, of which a free end forms the mobile disconnection element 4, is positioned in the protection device 1, and preferably in a casing 6 intended to receive the protection component 2.

The production method according to the present invention can comprise, preferably prior to the arrangement step (a), a step in which the protection component 2 is mounted in an insulating casing 6 provided with two elements 7, 8 for connection to the electrical installation.

The sub-step (c) includes a leaf mounting phase ($c_1$) in which the spring leaf 14 is placed in the casing 6, and one of the ends of the leaf 14 is attached, preferably to create a fitting connection between the leaf and a first element 7 for connecting the casing 6 to the electrical installation, while leaving the other end of the leaf 14 free.

The sub-step (c) also preferably comprises a bending phase ($c_2$) in which the remaining free end of the spring leaf 14 is forced to bend to approach that of a first power supply terminal 15 of the varistor 2 until the free end substantially comes into contact with the first power supply terminal 15.

The sub-step (c) also preferably comprises a soldering phase ($C_3$), in which a connection is created between the free end of the spring leaf 14 and the first power supply terminal 15 using a fusible filler material, preferably with a low melting point, and even more preferably, containing less than 0.1% by weight lead.

According to the present invention, the arrangement step (a) also preferably comprises a sub-step (d) in which the mobile signaling element 12 is mounted to pivot freely, with respect to the protection component 2, and more preferably in which the tubular sleeve 25 of the tipper is attached to an axle 24 forming a single piece with the body of the casing 6.

The arrangement step (a) preferably also comprises a sub-step (e) in which the first concave ramp segment 22A is placed opposite the free end of the spring leaf 14, preferably at the level of the point 14A, so that the leaf and the point, respectively, can come into sliding contact with the concave ramp segment 22A.

In addition, the arrangement step (a) preferably comprises a sub-step (f), which can be performed simultaneously or separately with respect to sub-step (e), in which the tipper 29 is placed in the casing 6 so that the visual indicator indicates normal operation.

In a particularly advantageous manner, the implementation of the sub-step (e) and/or the sub-step (f) can simultaneously cause the stopping of the projecting element 28 against the free end of the spring leaf 14.

It is also possible to use the slight angular range of movement allowed by the mechanical clearances existing between the ramp 22 and the spring leaf 14, as well as between the projecting element 28 and the spring leaf in order to facilitate the placement of the tipper during the arrangement step (a).

The identification and indexing conventions used to designate the steps, sub-steps and phases described above, as well as the preferred priority indicated, do not constitute a limitation on the order of execution of the steps, sub-steps and phases.

In particular, it is possible to consider producing, outside the casing 6, a sort of module including the protection component 2, the spring leaf 14 and the tipper 29, then placing the pre-assembled module inside the casing 6, without going beyond the scope of the present invention.

Having the spring leaf 14 and the tipper 29 on the same side of the varistor 2 and substantially parallel to the same side, advantageously makes it possible to perform the various steps of assembly, in particular, the aforementioned steps (a), (c), ($C_1$), ($C_2$), ($C_3$), (d), (e) and (f), allowing for excellent accessibility to the various placements of the casing 6 as well as the components already in place. In particular, the approach and the attachment of the tipper 29 can be performed substantially in a simple translation movement normal to the main extension surface of the varistor 2. Thus, the simplicity of the structure of the device 1 according to the present invention will be capable of allowing for at least partial automation of the assembly operations.

In addition, the width of the ramp 22, and, more specifically, the thickness of the tipper 29, and/or the width of the point 14A, will preferably be sized so that no dislocation can occur to permanently break the functional kinetic connection between the mobile disconnection element 4 and the mobile signaling element 12. In particular, the width of the spring leaf 14 can be substantially greater with the ranges of movement than any clearance, in particular, in translation or when stuck at the level of the pivot pin 24, 25, would allow in a direction substantially parallel to the axle 24. Thus, the spring leaf 14 cannot leave the ramp 22 and slide above or below the tipper 29 when moving from the closed configuration to the open configuration.

Thus, the device according to the present invention advantageously makes it possible to implement a particularly reliable signaling of the configuration with the disconnection means. Indeed, the signaling means are constantly mechanically held in a position range of controlled amplitude, whether the device is in the closed configuration, the open configuration, or even moving from the closed configuration to the open configuration, so that no unexpected modification of the signaling, in particular, no accidental movement of the visual indicator, is capable of occurring, in particular, when the device 1 undergoes mechanical shock.

In a particularly advantageous manner, the means implemented in order to guarantee this stability of the signaling means in no way constitute a brake or a hindrance to the movement of the mobile disconnection element, since the mobile signaling element has a very low resistance to movement with regard to the motor force that moves the mobile disconnection element. Thus, the reliability of the disconnection of the protection component in the case of excessive heating of the protection component is not significantly affected by the signaling means.

Finally, the device according to the present invention advantageously has an optimized production cost since the device comprises a limited number of parts with relatively simple shapes, which are relatively inexpensive to produce, and easy to assemble. In practice, the device comprises, in particular, in a preferred embodiment shown in FIGS. 1-5, only two moving parts, namely the tipper 29 and the spring leaf 14, without requiring an additional spring-type propulsion element. Moreover, the assembly operations can easily be automated since the mechanical connections used do not require complex approach and placement movements and are relatively insensitive to production variations.

The invention claimed is:

1. A device for protecting an electrical installation from overvoltages, comprising:

(a) at least one protection component to be connected to the electrical installation, (b) disconnection means capable of changing from a closed configuration in which the protection component is connected to the electrical installation to an open configuration in which the protection component is disconnected from the electrical installation, and (c) signalling means capable of indicating the configuration of the disconnection means, wherein the disconnection means comprise a spring leaf, of which a free end forms a mobile disconnection element, whereby the free end of the spring leaf is capable of moving, when changing from the closed configuration to the open configuration, in a rotational movement according to a first trajectory, wherein the signalling means comprise a mobile signalling element, and wherein the free end of the spring leaf, when going from the closed configuration to the open configuration, cooperates with the mobile signalling element to drive the mobile signalling element in rotation along a second trajectory different from the first trajectory.

2. The device of claim 1, wherein the mobile signalling element further comprises a cam with which the mobile disconnection element is capable of coming into sliding contact to drive the cam in rotation when going from the closed configuration to the open configuration.

3. The device of claim 2, wherein the cam is formed by a ramp provided at the level of the mobile signalling element.

4. The device of claim 1, further comprising a holding means that impede the movement of the mobile signalling element when the disconnection means are in the closed configuration.

5. The device of claim 4, wherein the mobile signalling element further comprises a projecting portion capable, when the disconnection means are in the closed configuration, of abutting a portion of the mobile disconnection element to form the holding means.

6. The device of claim 1, wherein the mobile signalling element pivots freely with respect to the protection component.

7. The device of claim 6, further comprising a casing in which the protection component is mounted and wherein the free pivot axle forms a single piece with the casing.

8. The device of claim 4, wherein the holding means are formed by elastic stress means which act at the level of the mobile signalling element in a manner that substantially opposes the mobile disconnection element.

9. The device of claim 1, further comprising a first anti-recoil means capable of limiting, when the disconnection means are in the open configuration, a possible return movement of the mobile signalling element toward the position occupied when the disconnection means were in the closed configuration.

10. The device of claim 1, further comprising a second anti-recoil means capable of limiting, when the disconnection means are in the open configuration, a possible return movement of the mobile disconnection element toward the position occupied in the closed configuration.

11. The device of claim 9, wherein the mobile disconnection element and the mobile signalling element, when the disconnection means are in the open configuration, are arranged to mutually impede the respective movements so that neither the mobile disconnection element nor the mobile signalling element can return substantially toward, and therefore to, the positions that where respectively occupied when the disconnection means were in the closed configuration.

12. The device of claim 1, wherein the mobile signalling element is formed by a single "tipper" part, including a concave area to cooperate with the mobile disconnection element, and a projecting extension to come into contact with the mobile disconnection element to impede the movement of the single part when the disconnection means are in the closed configuration.

13. The device of claim 1, wherein said free end of the spring leaf is capable of bending when going from the closed configuration to the open configuration.

14. The device of claim 13, wherein the free end of the spring leaf is held prestressed by a fusible solder when the disconnection means are in the closed configuration.

15. The device of claim 12, wherein the tipper and the spring leaf are arranged so that when the free end of the spring leaf bends during the change from the closed configuration to the open configuration, a portion of the spring leaf pushes the tipper at the concave area causing the tipper to pivot.

16. The device of claim 12, wherein a portion of the free end of the spring leaf impedes the movement of the projecting extension of the tipper when the spring leaf is in the closed configuration.

17. The device of claim 16, wherein the free end of the spring leaf moves away from the trajectory of the projecting extension of the tipper during the change from the closed configuration to the open configuration.

18. The device of claim 1, wherein the protection component is formed by a varistor.

19. A method for producing a device for protecting an electrical installation from overvoltages, the device comprising:

(a) at least one protection component intended to be connected to the electrical installation, (b) disconnection means capable of changing from a closed configuration in which the protection component is connected to the electrical installation to an open configuration in which the protection component is disconnected from the electrical installation, and (c) signalling means capable of indicating the configuration of the disconnection means, wherein the disconnection means comprise a spring leaf, of which a free end forms a mobile disconnection element, whereby the free end of the spring leaf is capable of moving, when changing from the closed configuration to the open configuration, in a rotational movement according to a first trajectory, and wherein the signalling means comprise a mobile signalling element, the method comprising: (i) arranging the mobile disconnection element with respect to the free end of the spring leaf so that, when changing from the closed configuration to the open configuration, the free end of the spring leaf cooperates with the mobile signalling element to drive the mobile signalling element in rotation along a second trajectory that is different from the first trajectory, and (ii) positioning the spring leaf in the protection device.

20. The method of claim 19, further comprising a step of producing a monolithic tipper intended to form the mobile signalling element, the tipper having a first concave ramp segment intended to cooperate with the mobile disconnection element.

21. The method of claim 19, wherein the arranging step further comprises a sub-step comprising mounting the mobile signalling element to pivot freely with respect to the protection component.

22. The method of claim 20, wherein the arranging step further comprises a sub-step comprising placing the first concave ramp segment opposite the free end of the spring leaf so that the spring leaf comes into sliding contact with the segment.

* * * * *